United States Patent
Shimbo et al.

(10) Patent No.: US 12,086,240 B2
(45) Date of Patent: Sep. 10, 2024

(54) ELECTRONIC DEVICE AND ATTACK DETECTION METHOD OF ELECTRONIC DEVICE

(71) Applicant: Hitachi, Ltd., Tokyo (JP)

(72) Inventors: Kenichi Shimbo, Tokyo (JP); Tadanobu Toba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 283 days.

(21) Appl. No.: 17/642,793

(22) PCT Filed: Dec. 7, 2020

(86) PCT No.: PCT/JP2020/045419
§ 371 (c)(1),
(2) Date: Mar. 14, 2022

(87) PCT Pub. No.: WO2021/117665
PCT Pub. Date: Jun. 17, 2021

(65) Prior Publication Data
US 2022/0414207 A1    Dec. 29, 2022

(30) Foreign Application Priority Data
Dec. 13, 2019  (JP) ................................ 2019-225330

(51) Int. Cl.
*G06F 21/55*    (2013.01)

(52) U.S. Cl.
CPC ...... *G06F 21/552* (2013.01); *G06F 2221/034* (2013.01)

(58) Field of Classification Search
CPC .. G06F 21/552; G06F 2221/034; G06F 21/52; G06F 21/56; G06F 21/566;
(Continued)

(56) References Cited

U.S. PATENT DOCUMENTS 8,528,093 B1 * 9/2013 Kureha ................. G06F 21/566
                                                      726/25
9,436,603 B1 * 9/2016 Pohlack ............. G06F 12/0808
(Continued)

FOREIGN PATENT DOCUMENTS

| CN | 106682498 A | * | 5/2017 | ............. G06F 21/53 |
| JP | 2019-225330 A | | 6/2021 | |
| WO | WO-2012135192 A2 | * | 10/2012 | ............. G06F 11/00 |

OTHER PUBLICATIONS

Andrzej Nowak, Pawel Szostek, Ahmad Yasin, Willy Zwaenepoel Low-Overhead Dynamic Instruction Mix Generation using Hybrid Basic Block Profiling 2018 IEEE International Symposium on Performance Analysis of Systems and Software (Year: 2018).*
(Continued)

*Primary Examiner* — Carl G Colin
*Assistant Examiner* — Habibullah
(74) *Attorney, Agent, or Firm* — MATTINGLY & MALUR, PC

(57) ABSTRACT

Malware infection or an abnormal operation caused by a malicious attack is detected in real time, even in an electronic device with relatively inferior processing capacity. An electronic device includes an executable code identification unit configured to receive an executable code string output from a processor, and identify at least an execution address in a user program region of an operating system (OS), and an execution address in a kernel region, and a determination unit configured to check a predetermined feature value obtained at a predetermined timing from an identification result obtained by the executable code identification unit, against a predetermined expected value, and determine that an attack happens, in a case where a difference is equal to or larger than a predetermined difference, and the determination unit notifies the processor of a predetermined abnor-
(Continued)

mality notification signal if the determination unit determines that an attack happens.

10 Claims, 10 Drawing Sheets

(58) Field of Classification Search
CPC .............. G06F 21/554; G06F 21/629; G05B 2219/23327; G05B 2219/23328; G05B 2219/23329
See application file for complete search history.

(56) References Cited

U.S. PATENT DOCUMENTS

| | | | | |
|---|---|---|---|---|
| 11,182,298 | B2* | 11/2021 | Sethuraman | G06F 12/0842 |
| 2014/0283076 | A1* | 9/2014 | Muttik | G06F 21/566 726/24 |
| 2015/0067763 | A1* | 3/2015 | Dalcher | G06F 21/554 726/1 |
| 2016/0028753 | A1* | 1/2016 | Di Pietro | G06F 21/577 726/23 |
| 2017/0083702 | A1* | 3/2017 | Gathala | G06F 21/552 |
| 2018/0039776 | A1* | 2/2018 | Loman | G06F 21/566 |
| 2019/0243769 | A1* | 8/2019 | Sethuraman | G06F 9/30021 |
| 2019/0306180 | A1* | 10/2019 | Dyakin | G06F 21/566 |
| 2021/0263779 | A1* | 8/2021 | Haghighat | G06F 21/78 |
| 2022/0335135 | A1* | 10/2022 | McGraw | G06F 11/3684 |

OTHER PUBLICATIONS

Jeffrey Dean James E. Hicks Carl A. Waldspurger William E. Weihl George Chrysos ProfileMe: Hardware Support for Instruction-Level Profiling on Out-of-Order Processors Digital Equipment Corporation (Year: 1997).*
Prashanth Krishnamurthy, Ramesh Karri, and Farshad Khorrami Anomaly Detection in Real-Time Multi-Threaded Processes Using Hardware Performance Counters IEEE Transactions on Information Forensics and Security, vol. 15, 2020 Date of publication Jun. 17, 2019 (Year: 2019).*
International Search Report PCT/JP2020/045419 Feb. 22, 2021.
Extended European Search Report received in corresponding European Application No. 20897866.8 dated Nov. 27, 2023.

* cited by examiner

ELECTRONIC DEVICE AND ATTACK DETECTION METHOD OF ELECTRONIC DEVICE

TECHNICAL FIELD

The present invention relates to an electronic device and an attack detection method of an electronic device. The present invention claims the benefit of Japanese Patent Application No. 2019-225330, filed Dec. 13, 2019, the entire contents of which are incorporated herein by reference in those designated states that allow incorporation by reference of literature.

BACKGROUND ART

Patent Literature 1 describes a technology of detecting an abnormal state of a server by monitoring a temporal change in a signature (feature value) obtained from manually-collectable system parameters (the number of login users, a web hit rate, the number of received packets, a CPU operating rate, a login error, a parity error, etc.).

CITATION LIST

Patent Literature

Patent Literature 1: JP 2004-348740 A

SUMMARY OF INVENTION

Technical Problem

In the technology described in Patent Literature 1 described above, an execution state inside a processor is not monitored, and it is difficult to detect an attack for each processor including falsification at a kernel level.

The object of the present invention is to detect malware infection or an abnormal operation caused by a malicious attack, in real time, even in an electronic device with relatively inferior processing capacity.

Solution to Problem

This application includes a plurality of means for solving at least part of the above-described problems, and examples of these are given as follows.

An electronic device according to an aspect of the present invention includes an executable code identification unit configured to receive an executable code string output from a processor, and identify at least an execution address in a user program region of an operating system (OS), and an execution address in a kernel region, and a determination unit configured to check a predetermined feature value obtained at a predetermined timing from an identification result obtained by the executable code identification unit, against a predetermined expected value, and determine that an attack happens, in a case where a difference is equal to or larger than a predetermined difference, and the determination unit notifies the processor of a predetermined abnormality notification signal if the determination unit determines that an attack happens.

Advantageous Effects of Invention

According to the present invention, it is possible to provide a technology of detecting malware infection or an abnormal operation caused by a malicious attack, in real time, even in an electronic device with relatively inferior processing capacity.

Problems, configurations, and effects other than those described above will become apparent from the description of the following embodiments.

DESCRIPTION OF EMBODIMENTS

Figure 1:
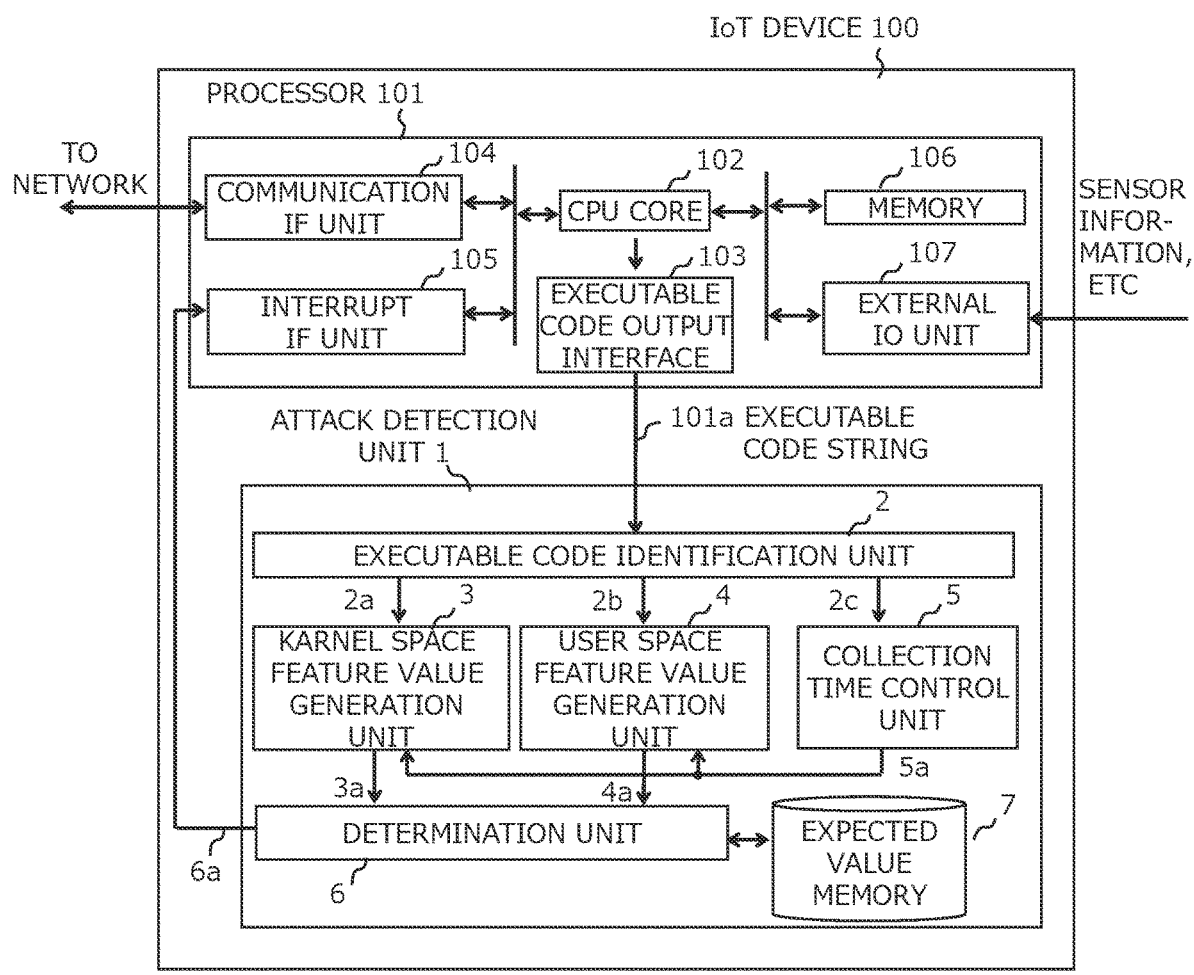
FIG. 1 is a diagram illustrating a configuration example of an IoT device being an electronic device according to a first embodiment.

In the following embodiments, the description will be given while dividing the description into a plurality of sections or embodiments, when necessary, for the sake of convenience. Nevertheless, unless expressly stated otherwise, the sections or embodiments are not to be considered independent of one another. One section or embodiment is in a relationship of a modification example, details, supplemental explanations, and the like of a part or all of the other section or embodiment.

In addition, in the following embodiments, in the case of referring to the numbers (including numbers, numerical values, amounts, ranges, and the like) of elements, the numbers are not limited to any specific number, unless expressly stated otherwise, and unless obviously limited to the specific numbers in principle, and may be the specific numbers or more, or less.

Furthermore, in the following embodiments, as a matter of course, the constituent elements (also including elemental steps) are not necessarily to be considered indispensable, unless expressly stated otherwise, and unless considered obviously indispensable in principle.

Similarly, in the following embodiments, in the case of referring to the shapes, positional relationship, and the like of the constituent elements, the shapes and the like are considered to include equivalents substantially approximate or similar to the shapes and the like, unless expressly stated otherwise, and unless obviously excluded in principle. The same applies to the numerical values and ranges described above.

In addition, throughout all of the drawings for explaining the embodiments, the same members are assigned the same reference numerals in principle, and the redundant descriptions thereof will be omitted. Nevertheless, in a case where the same nominal designation allocated to the same member changing along with an environmental variation or the like is highly likely to generate disruption, different reference numerals or names are sometimes allocated to the unchanged member and the changed member. Hereinafter, embodiments of the present invention will be described using the drawings.

In a system that uses Internet of Things (IoT), a large number of embedded devices including a connected car, a PLC, and an industrial robot in addition to a web camera and a sensor device are connected to a network. In such a system, security damages such as hijack of an IoT device itself, information theft caused by malware infection, and the use of a botnet have become obvious.

As conventional countermeasures taken by each server, a method of preventing entry of suspicious packets and fraudulent access by installing a firewall at the boundary of networks, and a method of preventing eavesdropping and falsification of communication information by cryptographic communication, authentication that uses a digital certificate, or the like are effective.

Nevertheless, because there are limitations on manufacturing and operational costs and performance resources of IoT devices, it is generally difficult to take security countermeasures similar to those of servers. On the other hand, in recent years, an attack that directly falsifies a boot file of a processor of an IoT device or the like on which an OS is installed has appeared. Thus, a technology of an IoT device itself monitoring an operating state, and detecting a malicious attack to a processor, and recovering from the malicious attack instead of completely blocking attacks and virus infection has been getting more important.

In addition, among IoT devices connected to networks, an increasing number of devices include OSs such as Linux that are installed on processors, and it becomes difficult to perform diagnosis using a conventional physical address-based executable code due to factors such as periodical interrupt executed by a kernel, and an operation by a virtual address. In addition, because the trace of processing content of processors is often limited, it is difficult to monitor all processing content.

An electronic device including an IoT device to which the technology according to the present invention is applied can detect, in real time, malware infection or an abnormal operation caused by a malicious attack, without decreasing processing performance of a processor. In addition, because it is possible to identify, in a short amount of time, an IoT device that has entered a fraudulent operating state such as a botnetted state due to malware infection, and notify a high-order system or the like, it becomes possible to take countermeasures such as disconnecting an abnormal device from networks early, and security damage can be prevented from spreading.

Using FIGS. 1 to 4, the description will be given using, as an example, an attack detection function-equipped IoT device (electronic device) that can detect an attack event to a processor such as falsification of programs and fraudulent manipulations performed from the outside, by monitoring operations while distinguishing between operations in a user program execution region (hereinafter, will also be referred to as a "user space"), and operations in a kernel region (hereinafter, will also be referred to as a "kernel space") based on executable code information of the processor.

Note that IoT is called "Internet of Things" in Japanese, and generally refers to heretofore-buried data being enabled to be processed, converted, analyzed, or linked by things (sensor devices, actuators, buildings, vehicles, electronic devices, etc.) that had not been conventionally connected to the Internet being connected to a server or a cloud via a network. In this application as well, the term "IoT" is used as similar concept.

FIG. 1 is a diagram illustrating a configuration example of an IoT device being an electronic device according to a first embodiment. An IoT device 100 includes a processor 101 that performs main processing (processing related to major functions allocated to the IoT device 100), and an attack detection unit 1 that detects an abnormal behavior of the processor that is caused by malware infection, hijack, or the like.

An operation example of the IoT device 100 itself is collecting externality information (measurement information of physicality) around the IoT device 100 that has been digitalized by a sensor module, in the processor 101 as sensor information, and transferring the sensor information to a cloud server or the like via a network, which is not illustrated in the drawings.

Here, the processor 101 includes one or a plurality of CPU cores 102, a memory 106 for storing execution programs and data, an executable code output interface 103 that sequentially outputs executable codes executed by the CPU cores 102, to the outside of the processor, a communication interface (IF) unit 104 serving as a communication unit for performing communication with a different device connecting to an external network, an interrupt interface (IF) unit 105 for receiving an interrupt signal from the outside, and an external IO unit 107 for connecting an external input-output signal of a sensor, an actuator, or the like.

In accordance with programs stored in the memory 106, the processor 101 performs calculation processing, statistical processing, artificial intelligence (AI) processing, or the like on sensor information. In addition, an OS such as the Linux is installed on the processor 101. These pieces of processing are divided into fine processes, and executed by being scheduled in the plurality of CPU cores 102 within the processor. The executable code output interface 103 sequentially outputs information including execution addresses processed by the CPU cores 102, and exception processing, to the attack detection unit 1 existing on the outside of the processor 101, as an executable code string 101a.

The attack detection unit 1 includes an executable code identification unit 2, a kernel space feature value generation unit 3, a user space feature value generation unit 4, a collection time control unit 5, a determination unit 6, and an expected value memory 7. The attack detection unit 1 detects an attack using the executable code string 101a output from the processor 101.

The executable code identification unit 2 identifies, from information regarding the executable code string 101a, an execution address 2a in a kernel space, an execution address 2b in a user space, and an interrupt code 2c generated by exception processing, and output the identified codes. The execution address 2a in the kernel space and the execution address 2b in the user space refer to addresses to be used in calling up commands and data in a virtual address space managed by an OS, or address information of a branch destination.

The kernel space feature value generation unit 3 generates a predetermined feature value using the input execution address 2a in the kernel space. For example, the kernel space feature value generation unit 3 counts the number of accesses to the execution address 2a in the kernel space, and outputs the counted number to the determination unit 6 as a feature value 3a in the kernel space.

The user space feature value generation unit 4 similarly generates a predetermined feature value using the input execution address 2b in the user space. For example, the user space feature value generation unit 4 counts the number of accesses to the execution address 2b in the user space, and outputs the counted number to the determination unit 6 as a feature value 4a in the user space.

If the interrupt code 2c is input, the collection time control unit 5 generates a feature value generation signal 5a, and inputs the feature value generation signal 5a to the kernel space feature value generation unit 3 and the user space feature value generation unit 4. The collection time control unit 5 thereby controls an output timing of each feature value.

Figure 2:
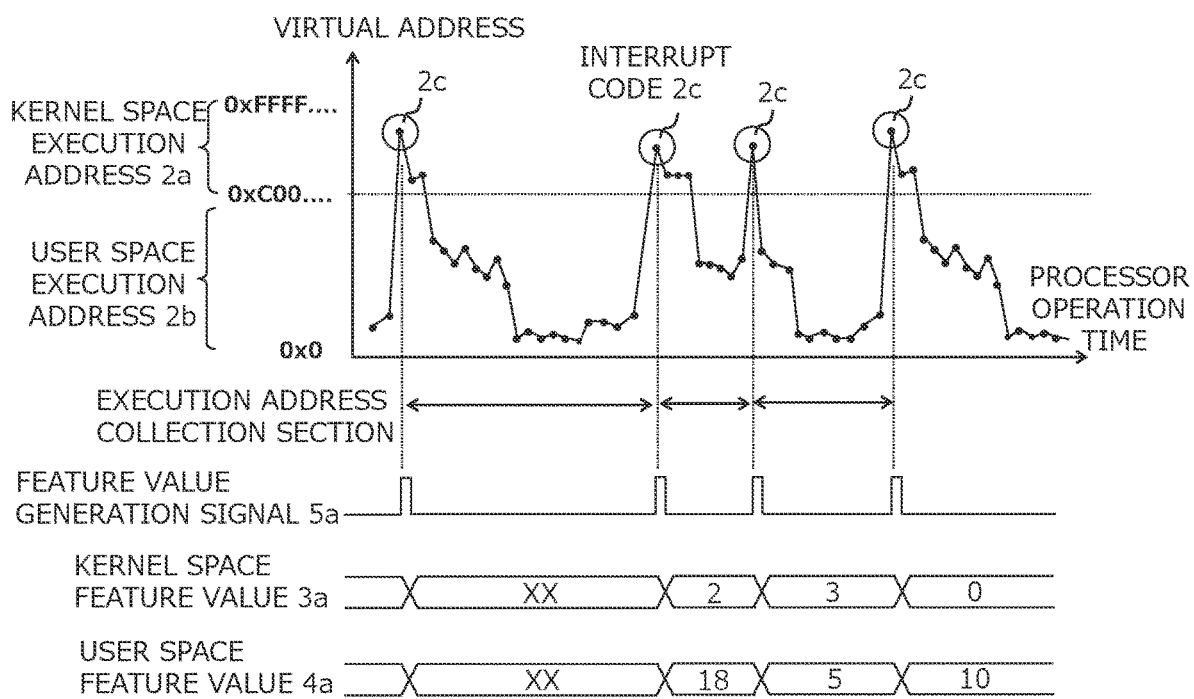
FIG. 2 is a diagram illustrating an example of data of an executable code string and a feature value according to the first embodiment.

FIG. 2 is a diagram illustrating an example of data of an executable code string and a feature value according to the first embodiment. A graph illustrated in the diagram is an image for explaining the generation of feature values that are based on the execution address 2a in the kernel space, the execution address 2b in the user space, and the interrupt code 2c that have been identified from the executable code string 101a. In the graph illustrated in the diagram, a vertical axis indicates a virtual address, and a horizontal axis indicates a detection cycle of an execution address, that is to say, an operation time of a processor, and the execution address 2a in the kernel space, the execution address 2b in the user space, and the interrupt code 2c that have been identified from the executable code string 101a are chronologically plotted.

A virtual address space is divided into an address region of a user space and an address region of a kernel space based on the setting of an OS. In other words, it can be determined from an execution address whether processing in the kernel space has been executed, or processing in a user program space has been executed. Furthermore, according to the interrupt code 2c, the occurrence of periodical interrupt of a kernel, or other exception processing can be determined.

In the first embodiment, the kernel space feature value generation unit 3 and the user space feature value generation unit 4 that have received the feature value generation signal 5a from the collection time control unit 5 output information indicating the number of times execution addresses have been collected so far, as a feature value. In other words, an occurrence interval of an interrupt code becomes an execution address collection section of the kernel space feature value generation unit 3 and the user space feature value generation unit 4. Each time the kernel space feature value generation unit 3 and the user space feature value generation unit 4 receive the feature value generation signal 5a, the kernel space feature value generation unit 3 and the user space feature value generation unit 4 individually output feature values generated from data of the execution addresses 2a in the kernel space and the execution addresses 2b in the user space that have been collected in the collection section.

Figure 3:
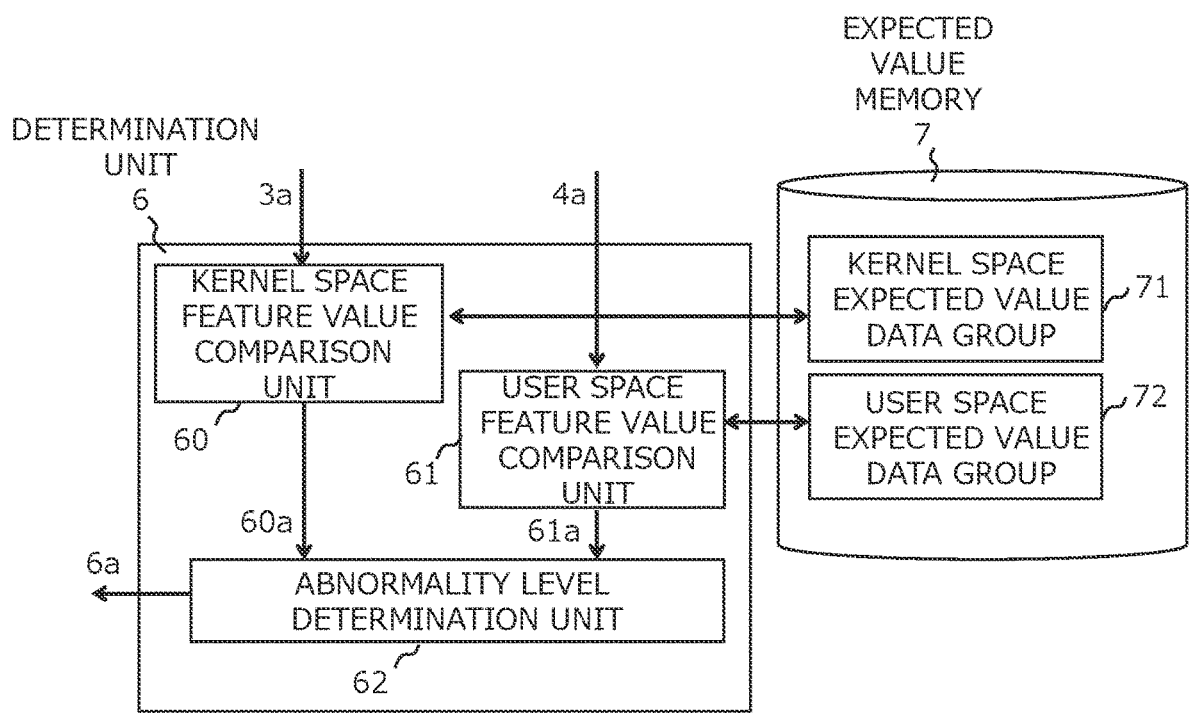
FIG. 3 is a diagram illustrating a configuration example of a determination unit and an expected value memory.

FIG. 3 is a diagram illustrating a configuration example of a determination unit and an expected value memory. The determination unit 6 includes a kernel space feature value comparison unit 60 that performs normality determination of the input feature value 3a in the kernel space, a user space feature value comparison unit 61 that performs normality determination of the input feature value 4a in the user space, and an abnormality level determination unit 62.

The expected value memory 7 prestores, as expected values, a plurality of feature values in a normal operation that are not subjected to malware infection or attacks, as a kernel space expected value data group 71 and a user space expected value data group 72.

The determination unit 6 checks the input feature value 3a in the kernel space and the input feature value 4a in the user space against the kernel space expected value data group 71 and the user space expected value data group 72 read from the expected value memory 7.

In a case where the input feature value 3a in the kernel space accords with none of expected value data in the kernel space expected value data group 71, the kernel space feature value comparison unit 60 outputs a disaccord signal 60a, and inputs the disaccord signal 60a to the abnormality level determination unit 62. In addition, in a case where the input feature value 4a in the user space accords with none of expected value data in the user space expected value data group 72, the user space feature value comparison unit 61 outputs a disaccord signal 61a, and inputs the disaccord signal 61a to the abnormality level determination unit 62.

The abnormality level determination unit 62 determines an abnormality level in accordance with a combination of the input disaccord signal 60a and the disaccord signal 61a, and generates an abnormality notification signal (interrupt signal) 6a to be transmitted to the processor 101. The abnormality notification signal 6a may be formed by a multibit signal for indicating an abnormality level.

Figure 4:
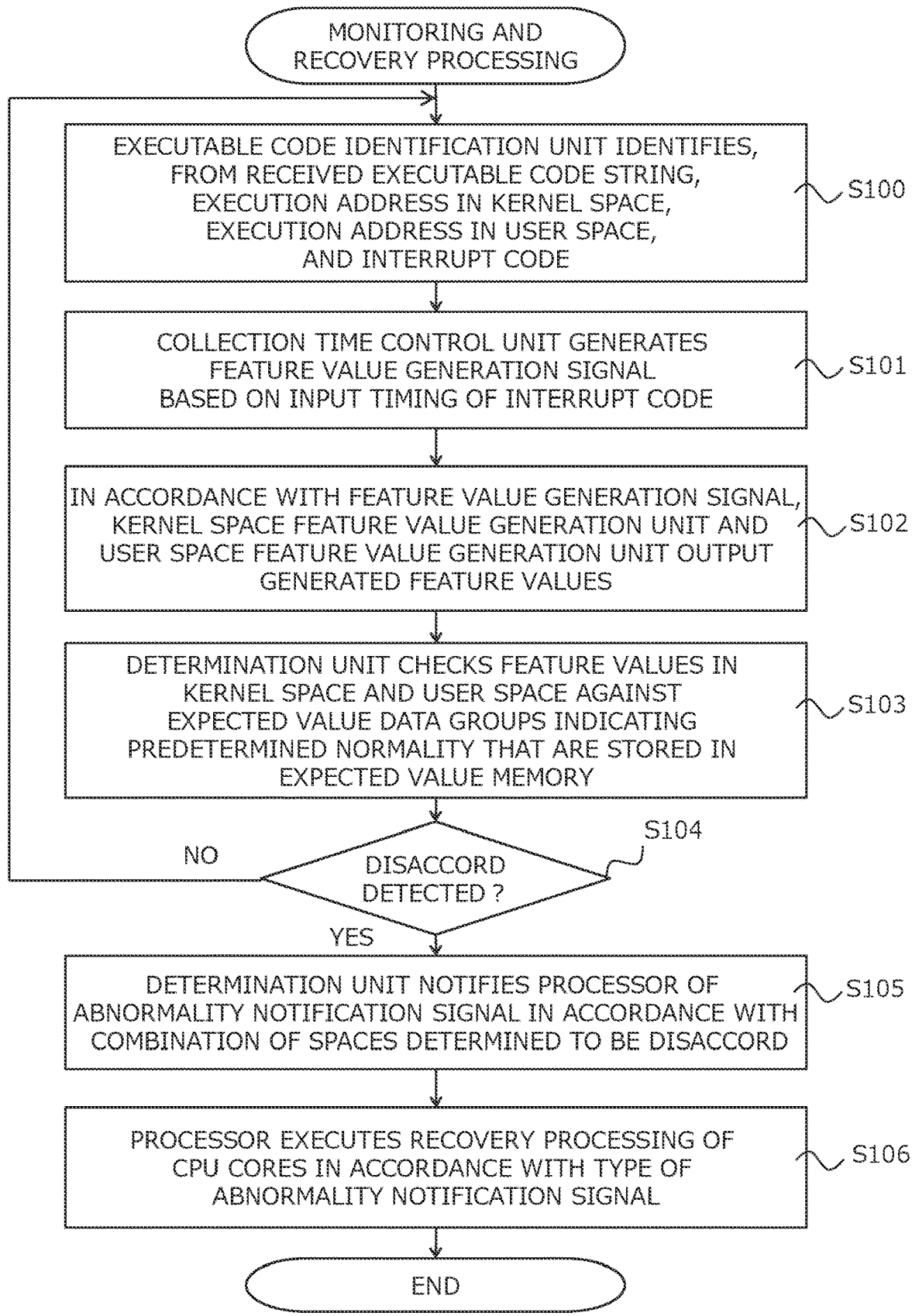
FIG. 4 is a diagram illustrating an example of a flow of monitoring and recovery processing according to the first embodiment.

FIG. 4 is a diagram illustrating an example of a flow of monitoring and recovery processing according to the first embodiment. The processor 101 and the executable code output interface 103 start the output of the executable code string 101a immediately after the completion of initialization processing including the boot of an OS and software reset, which is not illustrated in the diagram.

As needed, the attack detection unit 1 receives the executable code string 101a output from the processor 101 to be monitored. The executable code identification unit 2 identifies, from the received executable code string 101a, the execution address 2a in the kernel space, the execution address 2b in the user space, and the interrupt code 2c (Step S100).

Next, the collection time control unit 5 generates the feature value generation signal 5a at an input timing of the interrupt code 2c, and inputs the feature value generation signal 5a to the kernel space feature value generation unit 3 and the user space feature value generation unit 4 (Step S101).

Then, in accordance with the feature value generation signal 5a, the kernel space feature value generation unit 3 and the user space feature value generation unit 4 output the generated feature values (Step S102). Specifically, the kernel space feature value generation unit 3 and the user space feature value generation unit 4 that have received the feature value generation signal 5a from the collection time control unit 5 generate feature values based on execution addresses collected during a time period from the lastly-received feature value generation signal 5a, in a case where the previously-received feature value generation signal 5a exists, or execution addresses collected so far, in a case where the previously-received feature value generation signal 5a does not exist, and output the generated feature values to the determination unit 6.

The determination unit 6 checks feature values in the kernel space and the user space against expected value data groups prestored in the expected value memory 7 (Step S103).

Then, the determination unit 6 determines which of the disaccord signals 60*a* and 61*a* has been output (Step S104). In a case where none of the disaccord signals 60*a* and 61*a* has been output (in the case of "NO" in Step S104), the determination unit 6 returns the control to Step S100.

In a case where either the disaccord signal 60*a* or 61*a* has been output (in the case of "YES" in Step S104), the determination unit 6 notifies the processor 101 of the abnormality notification signal 6*a* in accordance with a combination of spaces determined to be disaccord (Step S105).

Specifically, in a case where only feature values regarding execution addresses in the user space disaccord with all of expected values, because there is a risk of falsification of user programs, the abnormality level determination unit 62 outputs an abnormality notification signal for requesting the processor 101 to execute software reset.

In a case where feature values regarding execution addresses in the kernel space disaccord with all of expected values, because there is a risk of falsification of an OS, the abnormality level determination unit 62 outputs an abnormality notification signal for disconnecting the IoT device 100 from the network, and checking a boot file and ROM data, to the processor 101.

Then, the processor 101 executes recovery processing of the CPU cores 102 in accordance with the type of the abnormality notification signal (Step S106). Specifically, as described above, the processor 101 executes software reset, or disconnects the IoT device 100 from the network and performs checking of a boot file and ROM data.

Heretofore, a flow of monitoring and recovery processing according to the first embodiment has been described. In the IoT device 100 according to the preset embodiment, by monitoring operations while distinguishing between operations in the user region and operations in the kernel region based on executable code information of the processor 101, an attack event to the processor such as falsification of programs or fraudulent manipulations performed from the outside can be detected by lightly-loaded processing. In other words, the reliability and security protection performance for detecting malware infection or an abnormal operation caused by a malicious attack, in real time, even in an electronic device with relatively inferior processing capacity can be enhanced.

In the preset embodiment, the attack detection unit 1 may be implemented by a device (coprocessor) different from the processor, or a similar processor may be prepared for mutual monitoring. Alternatively, the processor 101 and the attack detection unit 1 may be implemented within one chip using a field-programmable gate array (FPGA) or an application specific integrated circuit (ASIC). The description has been given of a configuration in which expected value data in the expected value memory 7 is preliminarily written in at a start-up time point of the processor, but a new expected value can be written in via the processor 101. In addition, feature values in the kernel space and the user space are directly compared with expected values, but a configuration is not limited to this. The determination unit 6 may use, as a predetermined feature value, a value of a ratio between the number of execution addresses in the user program region and the number of execution addresses in the kernel region, as a feature value. In addition, the kernel space feature value comparison unit 60 and the user space feature value comparison unit 61 output disaccord signals in a case where input feature values accord with none of expected value data in expected value data groups, but a configuration is not limited to this. The kernel space feature value comparison unit 60 and the user space feature value comparison unit 61 may output disaccord signals in a case where a difference exceeds a predetermined difference.

Heretofore, an attack detection function-equipped IoT device being an electronic device according to the first embodiment has been described. According to the electronic device according to the first embodiment, malware infection or an abnormal operation caused by a malicious attack can be detected in real time, even in an electronic device with relatively inferior processing capacity.

Second Embodiment

The present invention is not limited to the electronic device according to the first embodiment. For example, by monitoring operations regarding interrupt as feature values in addition to operations in the user space and operations in the kernel space, based on executable code information of a processor, an attack event to the processor such as falsification of programs and fraudulent manipulations performed from the outside may be detected. Such a second embodiment will be described using FIGS. 5 to 8.

An electronic device according to the second embodiment is basically the same as the electronic device according to the first embodiment, but partially differs. Hereinafter, the difference will be mainly described.

Figure 5:
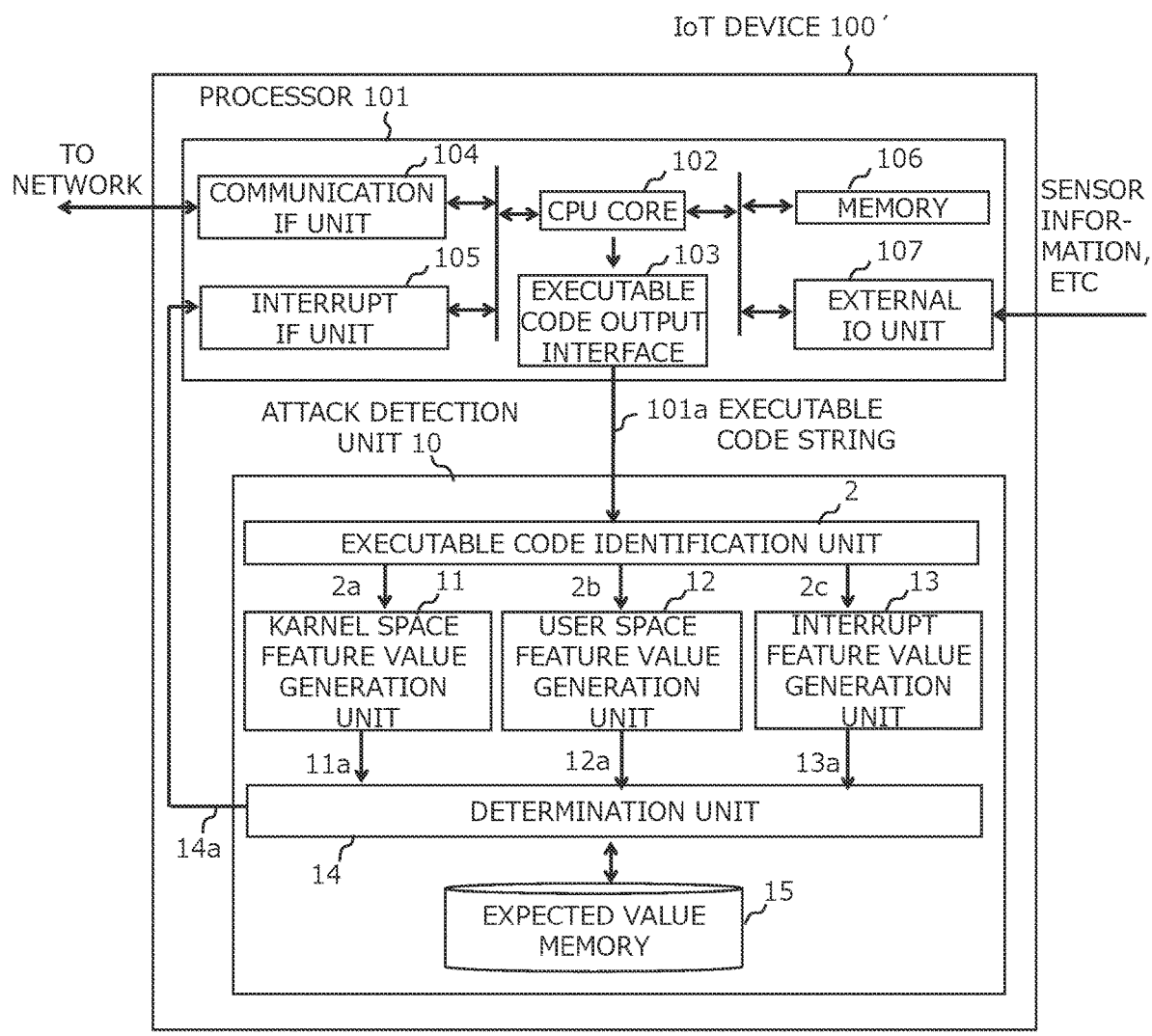
FIG. 5 is a diagram illustrating a configuration example of an IoT device being an electronic device according to a second embodiment.

FIG. 5 is a diagram illustrating a configuration example of an IoT device 100' being an electronic device according to the second embodiment. The IoT device 100' includes an attack detection unit 10. The attack detection unit 10 includes an executable code identification unit 2, a kernel space feature value generation unit 11, a user space feature value generation unit 12, an interrupt feature value generation unit 13, a determination unit 14, and an expected value memory 15.

The kernel space feature value generation unit 11 generates a predetermined feature value using an input execution address 2*a* in a kernel space. For example, the kernel space feature value generation unit 11 counts the number of accesses to the execution address 2*a* in the kernel space, and outputs the counted number to the determination unit 14 as a feature value 11*a* in the kernel space.

The user space feature value generation unit 12 similarly generates a predetermined feature value using an input execution address 2*b* in the user space. For example, the user space feature value generation unit 12 counts the number of accesses to the execution address 2*b* in the user space, and outputs the counted number to the determination unit 14 as a feature value 12*a* in the user space.

The interrupt feature value generation unit 13 generates a predetermined feature value using an input interrupt code 2*c*. For example, the interrupt feature value generation unit 13 counts the number of interrupts, and outputs the counted number to the determination unit 14 as a feature value 13*a*. Here, the attack detection unit 10 includes an internal time measuring unit (not illustrated in the diagram) to which an arbitrary time Ta can be set, and manages a generation cycle of each feature value using the arbitrary time Ta.

Figure 6:
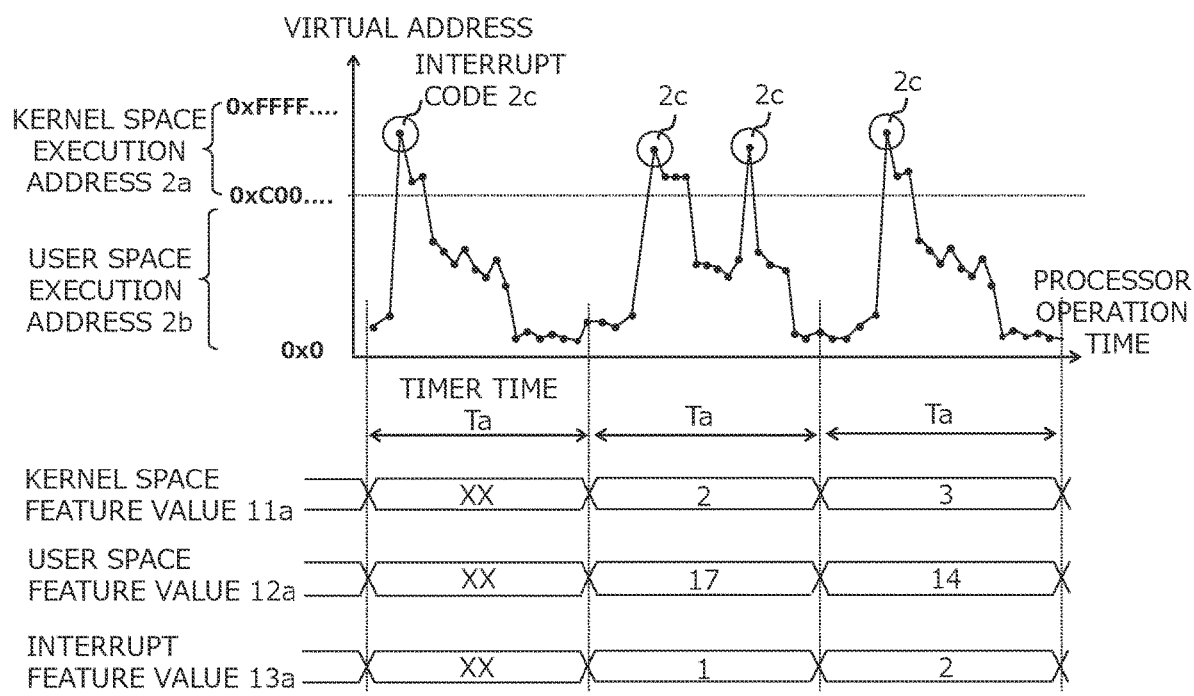
FIG. 6 is a diagram illustrating an example of data of an executable code string and a feature value according to the second embodiment.

FIG. 6 is a diagram illustrating an example of data of an executable code string and a feature value according to the second embodiment. A graph illustrated in the diagram is an image for explaining the generation of feature values that are based on the execution address 2*a* in the kernel space, the execution address 2*b* in the user space, and the interrupt code 2c that have been identified from the executable code string 101a. In the graph illustrated in the diagram, a vertical axis indicates a virtual address, and a horizontal axis indicates a detection cycle of an execution address, that is to say, an operation time of a processor, and the execution address 2a in the kernel space, the execution address 2b in the user space, and the interrupt code 2c that have been identified from the executable code string 101a are chronologically plotted.

Here, the kernel space feature value generation unit 11, the user space feature value generation unit 12, and the interrupt feature value generation unit 13 output execution addresses and the numbers of interrupts as feature values within a timer time indicated by the arbitrary time Ta set to the internal time measuring unit.

The determination unit 14 respectively compares the input feature value 11a in the kernel space, the input feature value 12a in the user space, and the input feature value 13a of interrupt with a kernel space expected value data group 71, a user space expected value data group 72, and an interrupt expected value data group read out from the expected value memory 15.

In a case where the input feature value 11a in the kernel space accords with none of expected value data in the kernel space expected value data group 71, the determination unit 14 outputs a disaccord signal. In addition, in a case where the input feature value 12a in the user space accords with none of expected value data in the user space expected value data group 72, the determination unit 14 outputs a disaccord signal. In addition, in a case where the input feature value 13a of interrupt accords with none of expected value data in the interrupt expected value data group, the determination unit 14 outputs a disaccord signal.

If a disaccord signal is output based on a feature value generated by any generation unit of the kernel space feature value generation unit 11, the user space feature value generation unit 12, and the interrupt feature value generation unit 13, the determination unit 14 outputs an abnormality notification signal 14a indicating an abnormal operation of the processor, in accordance with the combination.

The expected value memory 15 prestores, as expected values, a plurality of feature values in a normal operation that are not subjected to malware infection or attacks, as the kernel space expected value data group 71, the user space expected value data group 72, and the interrupt expected value data group.

Figure 7:
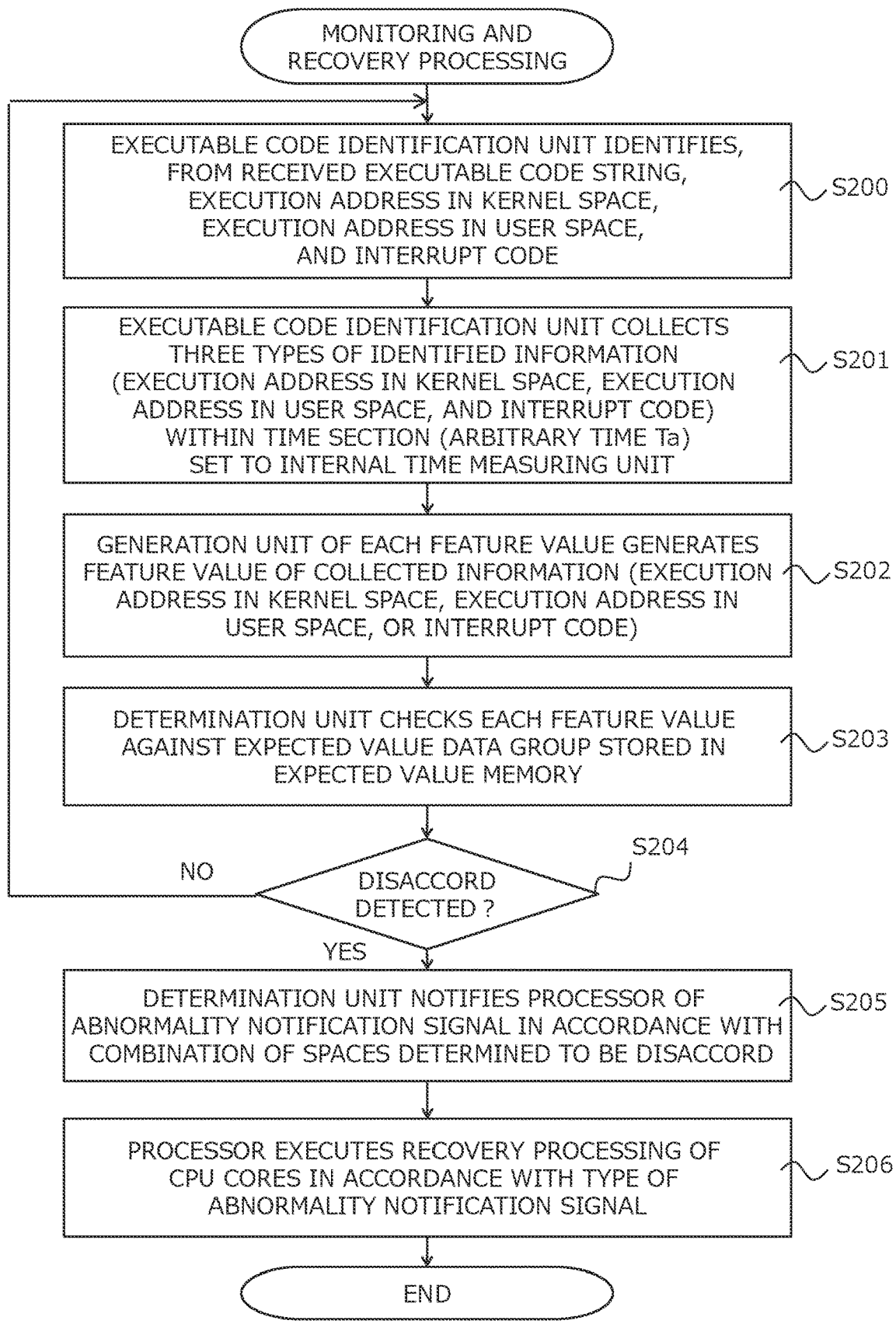
FIG. 7 is a diagram illustrating an example of a flow of monitoring and recovery processing according to the second embodiment.

FIG. 7 is a diagram illustrating an example of a flow of monitoring and recovery processing according to the second embodiment. The processor 101 and the executable code output interface 103 start the output of the executable code string 101a immediately after the completion of initialization processing including the boot of an OS and software reset, which is not illustrated in the diagram.

As needed, the attack detection unit 10 receives the executable code string 101a output from the processor 101 to be monitored. The executable code identification unit 2 identifies, from the received executable code string 101a, the execution address 2a in the kernel space, the execution address 2b in the user space, and the interrupt code 2c (Step S200).

Next, the executable code identification unit 2 collects three types of identified information (the execution address 2a in the kernel space, the execution address 2b in the user space, and the interrupt code 2c) within a time section (arbitrary time Ta) set to the internal time measuring unit (Step S201).

Then, a generation unit of each feature value generates a feature value of collected information (the execution address 2a in the kernel space, the execution address 2b in the user space, or the interrupt code 2c) (Step S202).

Then, the determination unit 14 checks each feature value against a corresponding expected value data group stored in the expected value memory 15 (Step S203).

Then, the determination unit 14 determines whether any disaccord signal has been output (Step S204). In a case where none of the disaccord signals has been output (in the case of "NO" in Step S204), the determination unit 14 returns the control to Step S200.

In a case where any disaccord signal has been output (in the case of "YES" in Step S204), the determination unit 14 notifies the processor 101 of the abnormality notification signal 14a in accordance with a combination of spaces or an interrupt code determined to be disaccord (Step S205).

Specifically, in a case where only feature values regarding execution addresses in the user space disaccord with all of expected values, because there is a risk of falsification of user programs, the determination unit 14 notifies the processor 101 of an abnormality notification signal 14a for requesting the processor 101 to execute software reset.

In a case where feature values regarding execution addresses in the kernel space disaccord with all of expected values, because there is a risk of falsification of an OS, the determination unit 14 outputs an abnormality notification signal 14a for disconnecting the IoT device 100' from the network, and checking a boot file and ROM data, to the processor 101.

In a case where feature values regarding interrupt codes disaccord with all of expected values, because there is a risk of falsification including a kernel operation, the determination unit 14 outputs an abnormality notification signal 14a for disconnecting the IoT device 100' from the network, checking a boot file and ROM data, and requesting software reset, to the processor 101.

Note that the configuration is not limited to this, and the abnormality notification signal 14a may be finely set in accordance with spaces or interrupt codes determined to be disaccord, and handling may be finely changed by outputting the abnormality notification signal.

Then, the processor 101 executes recovery processing of the CPU cores 102 in accordance with the type of the abnormality notification signal (Step S206). Specifically, as described above, the processor 101 executes software reset, or disconnects the IoT device 100 from the network and performs checking of a boot file and ROM data.

Heretofore, a flow of monitoring and recovery processing according to the second embodiment has been described. In the IoT device 100' according to the second embodiment, by monitoring operations while distinguishing between operations in the user region, operations in the kernel region, and interrupt codes based on executable code information of the processor 101, an attack event to the processor such as falsification of programs or fraudulent manipulations performed from the outside can be detected by lightly-loaded processing. In other words, the reliability and security protection performance for detecting malware infection or an abnormal operation caused by a malicious attack, in real time, even in an electronic device with relatively inferior processing capacity can be enhanced.

Note that the arbitrary time Ta is not limited to a fixed value, and may vary depending on an external environment or the like. For example, in the case of an IoT device used in an industrial plant, the arbitrary time Ta may be varied depending on an operating environment of the industrial plant (operating date, day of the week, season, temperature, etc.). Alternatively, in the case of an in-vehicle IoT device, the arbitrary time Ta may be varied between a running state and a parked state of a vehicle.

Figure 8:
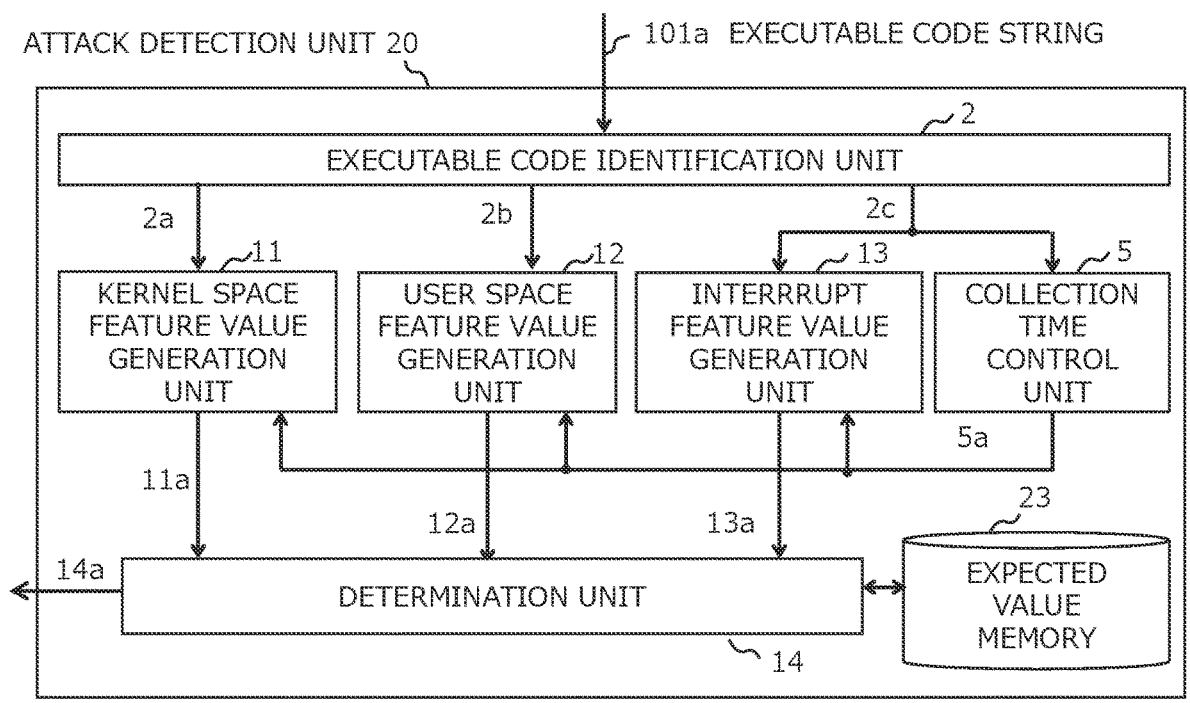
FIG. 8 is a diagram illustrating a different configuration example of an attack detection unit according to the second embodiment.

FIG. 8 is a diagram illustrating a different configuration example of an attack detection unit according to the second embodiment. An attack detection unit 20 further includes the collection time control unit 5 according to the first embodiment (that controls a generation timing of a feature value at a timing corresponding to the occurrence of the interrupt code 2c). By using the interrupt code 2c for both of feature values and time control, the attack detection unit 20 can perform further finer abnormality determination. In this case, because a feature value is generated in accordance with an occurrence interval of interrupt, as a feature value of interrupt, it is desirable to use an occurrence interval (time) of interrupt as a feature value instead of the number of interrupts.

Expected value data in the expected value memory 23 of this different example may store three types of feature values in such a manner as to individually determine the feature values, or in such a manner as to perform disaccord determination of kernel space feature values and user space feature values in association with an interrupt occurrence interval, in such a manner as to determine a kernel space or user space feature value generated when an interrupt occurrence interval is the same, for example.

In addition, feature values of the kernel space, the user space, and interrupt are directly compared with expected values, but a configuration is not limited to this. The determination unit 14 may use, as a predetermined feature value, a value of a ratio between the number of execution addresses in the user program region, the number of execution addresses in the kernel region, and the number of interrupts or an occurrence interval of interrupt as a feature value.

In addition, the determination unit 14 outputs a disaccord signal in a case where input feature values accord with none of expected value data in expected value data groups, but a configuration is not limited to this. The determination unit 14 may output a disaccord signal in a case where a difference exceeds a predetermined difference.

Heretofore, a different configuration example of the second embodiment has been described. In this configuration example, the attack detection unit 20 can perform further finer abnormality determination.

Third Embodiment

The present invention is not limited to the electronic devices according to the first embodiment, the second embodiment, and the different example thereof. For example, feature value information in a normal operation may be made correctable. An example of an IoT device 100" according to such a third embodiment will be described using FIG. 9.

An electronic device according to the third embodiment is basically the same as the electronic device according to the second embodiment, but partially differs. Hereinafter, the difference will be mainly described.

Figure 9:
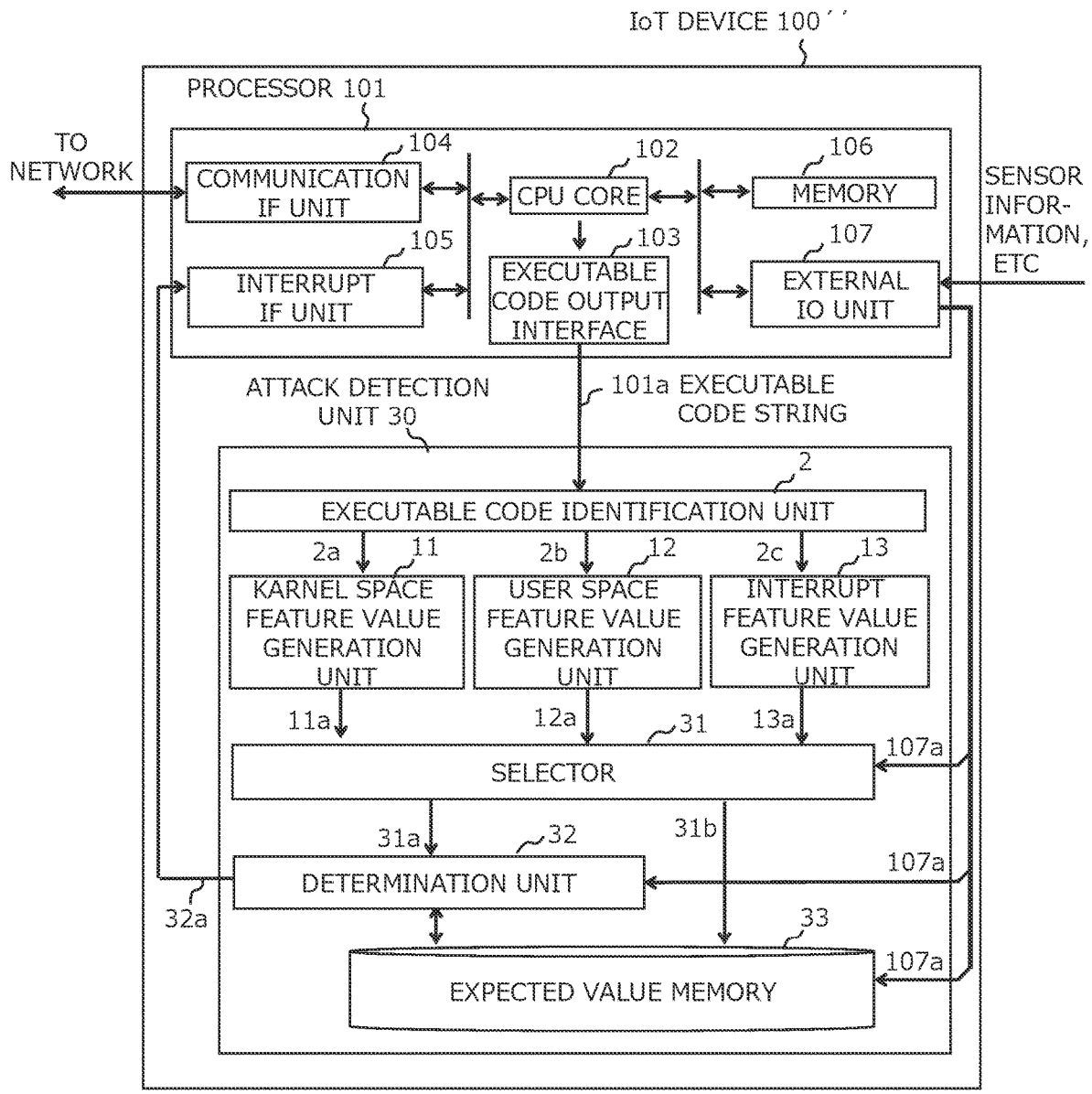
FIG. 9 is a diagram illustrating a configuration example of an IoT device being an electronic device according to a third embodiment.

FIG. 9 is a diagram illustrating a configuration example of an IoT device being an electronic device according to the third embodiment. The IoT device 100" includes an attack detection unit 30. The attack detection unit 30 includes an executable code identification unit 2, a kernel space feature value generation unit 11, a user space feature value generation unit 12, an interrupt feature value generation unit 13, a selector 31, a determination unit 32, and an expected value memory 33. In addition, an external IO unit 107 according to the processor 101 transmits a mode switching signal 107a to the selector 31, the determination unit 32, and the expected value memory 33.

The attack detection unit 30 is provided with two types of operation modes including a correction mode and a normal determination mode, and switches an operation mode upon receiving the mode switching signal 107a. For example, at the time of a pre-shipment test of the IoT device 100" or the like, the IoT device 100" is operated in the correction mode for performing correction using feature values collected in a normal operation, that is to say, the correction mode for causing the expected value memory 33 to perform learning, and the IoT device 100" can be shipped after switching the operation mode to the normal determination mode by transmitting the mode switching signal 107a from the processor 101 at the time of shipment.

The switching control of operation modes is basically performed from the processor 101. The mode switching signal 107a is input to the selector 31 (also called selection unit), the determination unit 32, and the expected value memory 33 of the attack detection unit 30.

If the operation mode is the normal determination mode, the selector 31 transmits a generated feature value to the determination unit 32, and if the operation mode is the correction mode, the selector 31 transmits a generated feature value to the expected value memory 33. In other words, the selector 31 selectively transmits a feature value to either the determination unit 32 or the expected value memory 33 in accordance with the operation mode.

Specifically, the selector 31 performs switching of a port from which a feature value 11a in the kernel space, a feature value 12a in the user space, or a feature value 13a of interrupt is output. The selector 31 performs switching in such a manner as to output each feature value from a port 31a on the determination unit 32 side in the case of the normal determination mode, and output each feature value from a port 31b on the expected value memory 33 side in the case of the correction mode.

In the case of the correction mode, the determination unit 32 stops determination processing in such a manner as to prevent a wrong abnormality notification from being output to the processor 101, and avoids outputting an abnormality notification signal 32a.

In the case of the correction mode, if the expected value memory 33 receives each generated feature value from the port 31b, the memory is searched for the received feature value, and in a case where the same value is not already stored, the expected value memory 33 additionally stores a new feature value into a vacant memory region. While an operation is performed in the correction mode, the expected value memory 33 repeats the above-described operation, and stores (learns) feature values generated during the operation. If the expected value memory 33 receives the mode switching signal 107a, the expected value memory 33 cancels the correction mode, and switches the operation mode to the normal determination mode. In the normal determination mode, the expected value memory 33 delivers all the stored feature values to the determination unit 32.

Heretofore, the IoT device 100" according to the third embodiment has been described. In the IoT device 100" according to the third embodiment, by having a function of automatically accumulating feature values generated during the operation of the processor 101, into the expected value memory 33 while excluding redundancy, even in a case where a program of the processor 101 is changed, for example, feature values can be automatically adjusted to new feature values by once operating in the correction mode.

In the IoT device 100″, remotely-operated batch update of programs, such as a change in a connected sensor, and a change in calculation processing on acquired data, is expected to be performed. At this time, by having a function of automatically performing correction, it is possible to reduce the number of update man-hours especially in an environment in which a large number of IoT devices 100″ exist.

In addition, the function of correction is not limited to this, and correction may be performed by identifying an expected value by performing simple statistical processing on acquired actual measured values. For example, a median value or an average value can be employed. Alternatively, expected values may be stored as an individual table in accordance with an external environment (for example, date or day or the week), and an expected value data group may be switched by switching a table in accordance with an external environment at the time of an operation. With this configuration, a large variation in expected value can be excluded.

Fourth Embodiment

Figure 10:
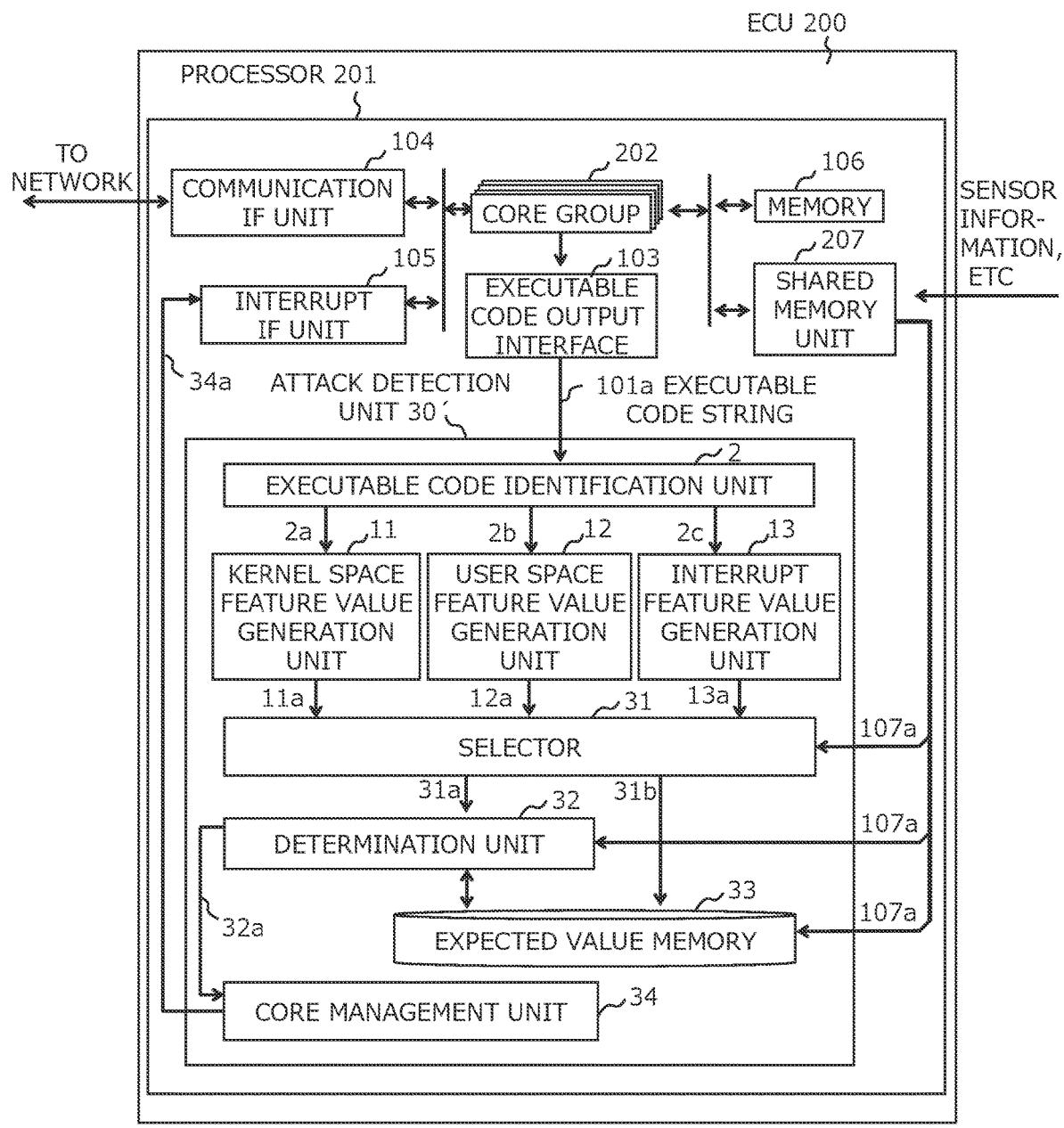
FIG. 10 is a diagram illustrating a configuration example of an ECU being an electronic device according to a fourth embodiment.

The present invention is not limited to the electronic devices according to the first embodiment, the second embodiment, the different example thereof, and the third embodiment. For example, the application example is not limited to an IoT device, and the present invention may be applied to an electronic control unit (ECU) mounted on a vehicle. An example of an ECU according to such a fourth embodiment will be described using FIG. 10.

An electronic device according to the fourth embodiment is basically the same as the electronic device according to the third embodiment, but partially differs. Hereinafter, the difference will be mainly described.

In an in-vehicle ECU 200 according to the fourth embodiment, an attack detection unit 30′ is included in a processor 201. In addition, a core group 202 including a plurality of CPUs is included in place of CPU cores. In addition, a mode switching signal 107a is delivered to a selector 31, a determination unit 32, and an expected value memory 33 via a shared memory unit 207.

The attack detection unit 30′ includes a core management unit 34, and the determination unit 32 transmits an abnormality notification signal 32a not to an interrupt IF unit 105 but to the core management unit 34.

The core management unit 34 transmits a control signal 34a of an operation of each core of the core group 202 via an interrupt IF unit 105, and separates a specific core from the core group 202 or cause a core to join the core group 202. If the core management unit 34 receives the abnormality notification signal 32a output from the determination unit 32, by separating an abnormal core from the core group 202, the core management unit 34 avoids propagation of abnormality to the processor 201.

In particular, because an ECU of a vehicle performs real-time control, and plays an important role for ensuring safety, damage control to the minimum range at the time of abnormality occurrence, and prompt recovery are important.

In addition, the attack detection unit 30′ itself can also serve as a specific core included in the core group 202.

Heretofore, the ECU being an electronic device according to the fourth embodiment has been described. According to the electronic device according to the fourth embodiment, it becomes possible to promptly perform abnormality detection of a vehicle on which the electronic device is mounted, minimize the influence, and promptly perform recovery.

The above-described embodiments have been described in detail for clearly explaining the present invention, and are not necessarily limited to embodiments including all the described configurations.

In addition, as for a part of configurations of the embodiments, a configuration can be added, deleted, or replaced. In addition, the above-described components, configurations, functions, processing units, and the like may be partially or entirely achieved by hardware by designing by integrated circuits, for example. In addition, the above-described components, configurations, functions, and the like may be achieved by software by a processor interpreting and executing programs for achieving the functions. Information such as programs, tables, and files for achieving the functions can be stored on a recording device such as a memory, a hard disk, or an SSD, or a recording medium such as an IC card, an SD card, or a DVD.

Note that control lines and information lines according to the above-described embodiments that are considered to be necessary for the sake of explanation are indicated, and not all of the control lines and information lines of a product are always indicated. In fact, it may be considered that almost all of the configurations are interconnected.

Heretofore, the present invention has been described mainly based on the embodiments.

REFERENCE SIGNS LIST

1 Attack detection unit
2 Executable code identification unit
2a Execution address in kernel space
2b Execution address in user space
2c Interrupt code
3 Kernel space feature value generation unit
3a Feature value in kernel space
4 User space feature value generation unit
4a Feature value in user space
5 Collection time control unit
5a Feature value generation signal
6 Determination unit
6a Abnormality notification signal
7 Expected value memory
100 IoT device
101 Processor
101a Executable code string
102 CPU core
103 Executable code output interface
104 Communication IF unit
105 Interrupt IF unit
106 Memory
107 External IC unit.

The invention claimed is:

1. An electronic device comprising:
a first hardware processor; and
a second hardware processor,
wherein the first hardware processor is configured to execute:
an executable code identification software code unit configured to receive an executable code string output from the second hardware processor and identify an execution address in a kernel space, an execution address in a user space, and an interrupt code;
a kernel space feature value generation software code unit,
a user space feature value generation software code unit;

a collection time control software code unit; and
a determination software code unit,
wherein the collection time control software code unit generates a feature value generation signal based on the interrupt code and inputs the feature value generation signal to the kernel space feature value generation software code unit and the user space feature value generation software code unit,
wherein the kernel space feature value generation software code unit counts a number of accesses to the execution address in the kernel space, and outputs the counted number to the determination software code unit as a feature value in the kernel space based on the feature value generation signal,
wherein the user space feature value generation software code unit counts a number of accesses to the execution address in the user space, and outputs the counted number to the determination software code unit as a feature value in the user space based on the feature value generation signal,
wherein the determination software code unit respectively checks the feature value in the kernel space and the feature value in the user space against predetermined expected values and determines that an attack happens upon determining a difference is equal to or greater than a predetermined difference, and
wherein the determination software code unit notifies the second hardware processor of a predetermined abnormality notification signal if the determination software code unit determines that an attack happens.

2. The electronic device according to claim 1,
wherein the executable code identification software code unit identifies a number of occurrences of interrupts to an operating system (OS) of the second hardware processor using the executable code string, and
wherein the determination software code unit uses the number of occurrences of interrupts to the OS.

3. The electronic device according to claim 1,
wherein the determination software code unit uses a value of a ratio between the number of accesses to the execution addresses in the user space and the number of accesses to the execution addresses in the kernel space.

4. The electronic device according to claim 1,
wherein the executable code identification software code unit identifies a number of occurrences of interrupts to an operating system (OS) using the executable code string, and
the determination software code unit uses a value of a ratio between the number of accesses to the execution addresses in the user space, the number of accesses to the execution addresses in the kernel space, and the number of occurrences of interrupts to the OS.

5. The electronic device according to claim 1,
wherein, if the second hardware processor receives the abnormality notification signal, the second hardware processor performs predetermined reset processing in accordance with the abnormality notification signal.

6. The electronic device according to claim 1,
wherein the determination software code unit uses, as the predetermined timing, lapse of a predetermined time.

7. The electronic device according to claim 1, comprising:
a selection software code unit configured to perform correction of the expected value by bringing the identification result into candidates of the expected value upon receiving a start instruction.

8. The electronic device according to claim 1,
wherein the second hardware processor includes:
a predetermined sensor; and
a communication interface configured to transmit and receive information including information obtained by the sensor, to and from a connected different device on a predetermined network.

9. An in-vehicle electronic control unit (ECU) comprising:
a hardware processor configured to execute:
an executable code identification software code unit configured to receive an executable code string output from a central processing unit (CPU) core group, identify an execution address in a kernel space, an execution address in a user space, and an interrupt code;
a kernel space feature value generation software code unit,
a user space feature value generation software code unit;
a collection time control software code unit;
a determination software code unit, wherein the collection time control software code unit generates a feature value generation signal based on the interrupt code and inputs the feature value generation signal to the kernel space feature value generation software code unit and the user space feature value generation software code unit; and
a core management software code unit,
wherein the kernel space feature value generation software code unit counts a number of accesses to the execution address in the kernel space, and outputs the counted number to the determination software code unit as a feature value in the kernel space based on the feature value generation signal,
wherein the user space feature value generation software code unit counts a number of accesses to the execution address in the user space, and outputs the counted number to the determination software code unit as a feature value in the user space based on the feature value generation signal,
wherein the determination software code unit respectively checks the feature value in the kernel space and the feature value in the user space against predetermined expected values and determines that an attack happens upon determining a difference is equal to or greater than a predetermined difference, and
wherein the core management software code unit is configured to notify a predetermined signal for separating a CPU core determined to be subjected to the attack, from the CPU core group.

10. An attack detection method of an electronic device, the electronic device executing steps comprising:
executable code identification processing of receiving an executable code string output from a second hardware processor and identifying an execution address in a kernel space, an execution address in a user space, and an interrupt code;
generating a feature value generation signal based on the interrupt code;
counting a number of accesses to the execution address in the kernel space, and outputting the counted number as a feature value in the kernel space based on the feature value generation signal;
counting a number of accesses to the execution address in the user space, and outputting the counted number as a feature value in the user space based on the feature value generation signal;
respectively checking the feature value in the kernel space and the feature value in the user space against predetermined expected values and determines that an attack happens upon determining a difference is equal to or greater than a predetermined difference; and notification processing of notifying the second hardware processor of a predetermined abnormality notification signal if determining that an attack happens.

\* \* \* \* \*